No. 773,305. PATENTED OCT. 25, 1904.
F. L. O. WADSWORTH.
WIRE GLASS SHEET OR TILE AND METHOD OF MAKING SAME.
APPLICATION FILED OCT. 3, 1903.
NO MODEL. 3 SHEETS—SHEET 1.
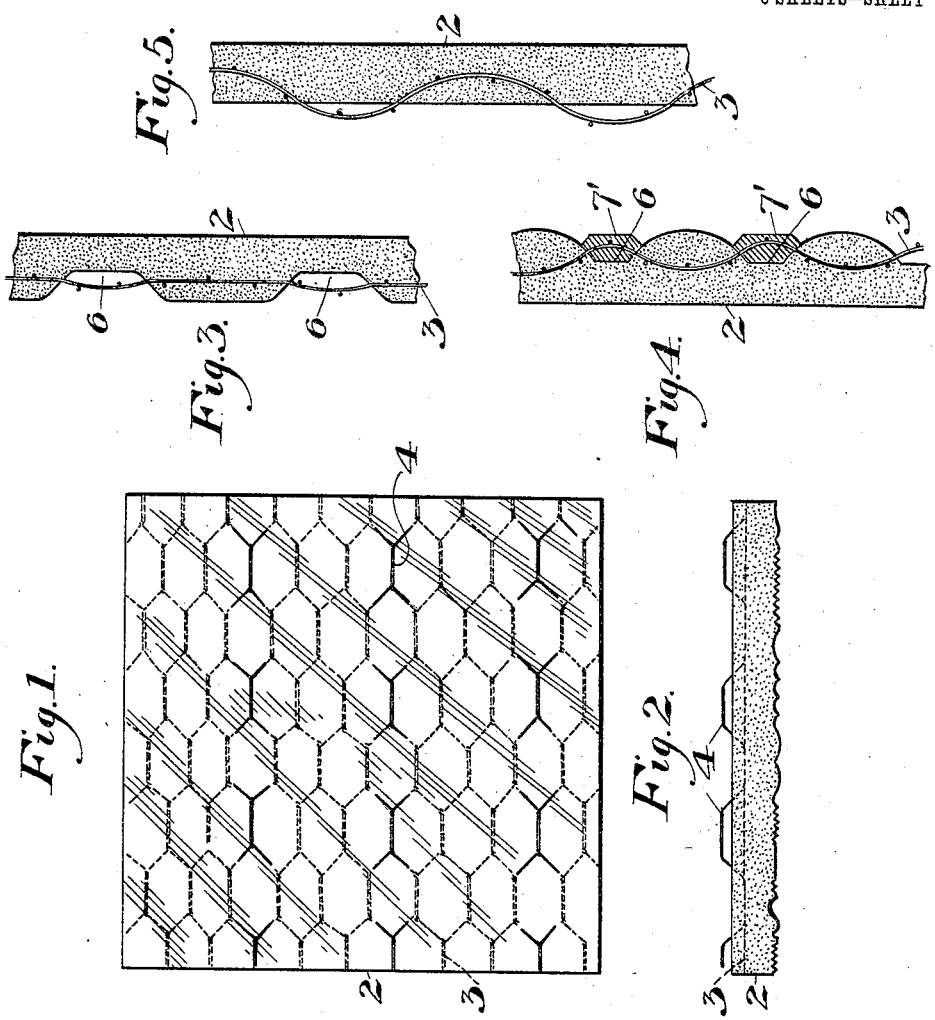
WITNESSES
INVENTOR

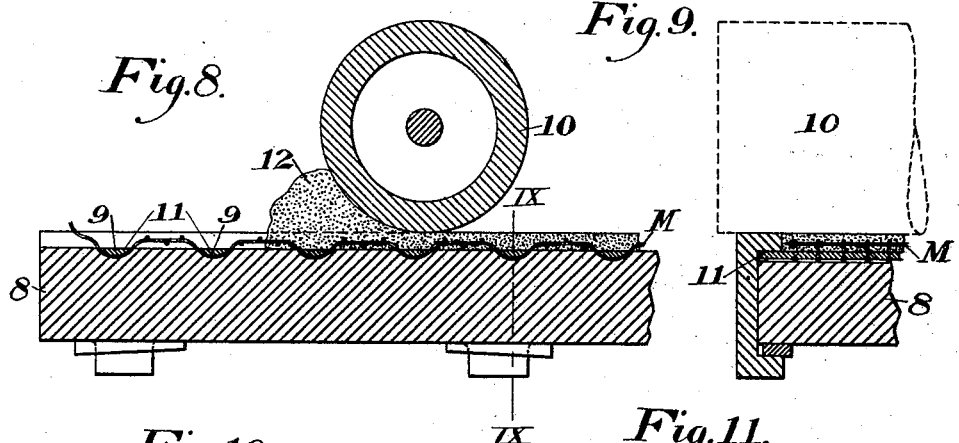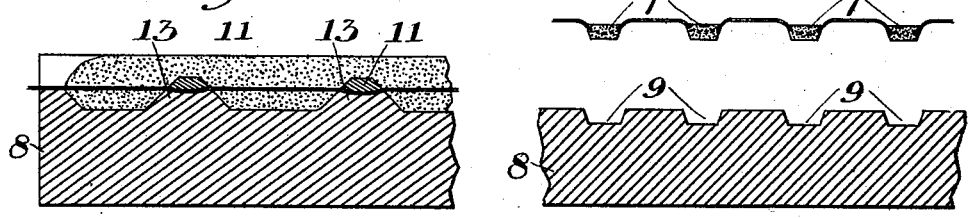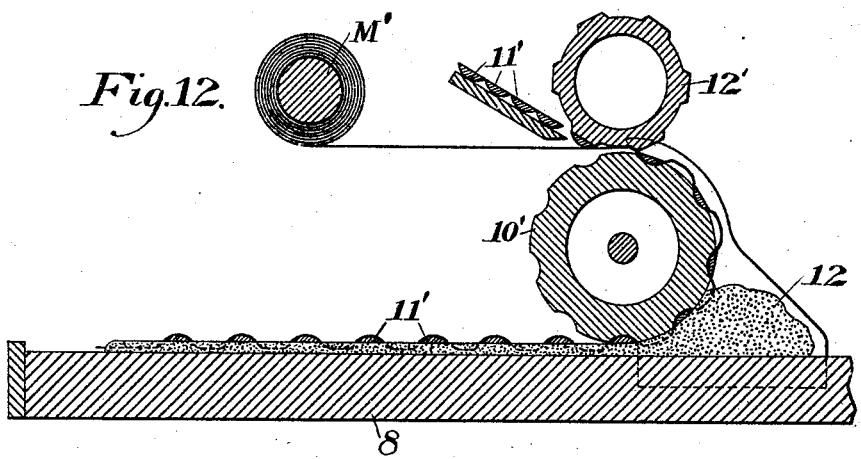

No. 773,305. PATENTED OCT. 25, 1904.
F. L. O. WADSWORTH.
WIRE GLASS SHEET OR TILE AND METHOD OF MAKING SAME.
APPLICATION FILED OCT. 3, 1903.
NO MODEL. 3 SHEETS—SHEET 3.
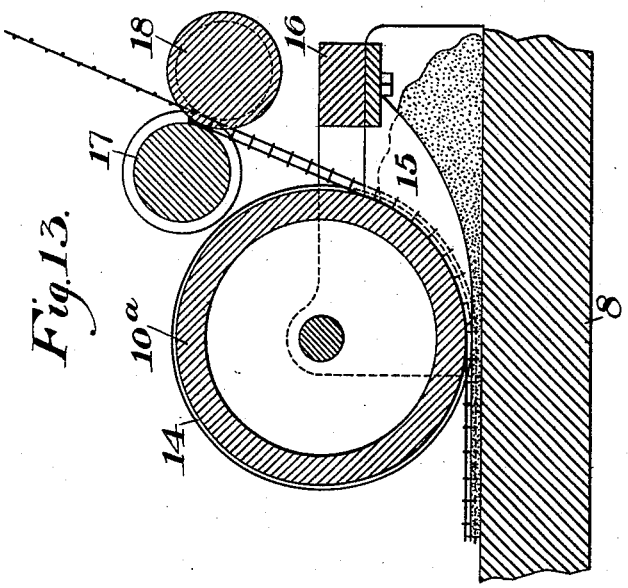
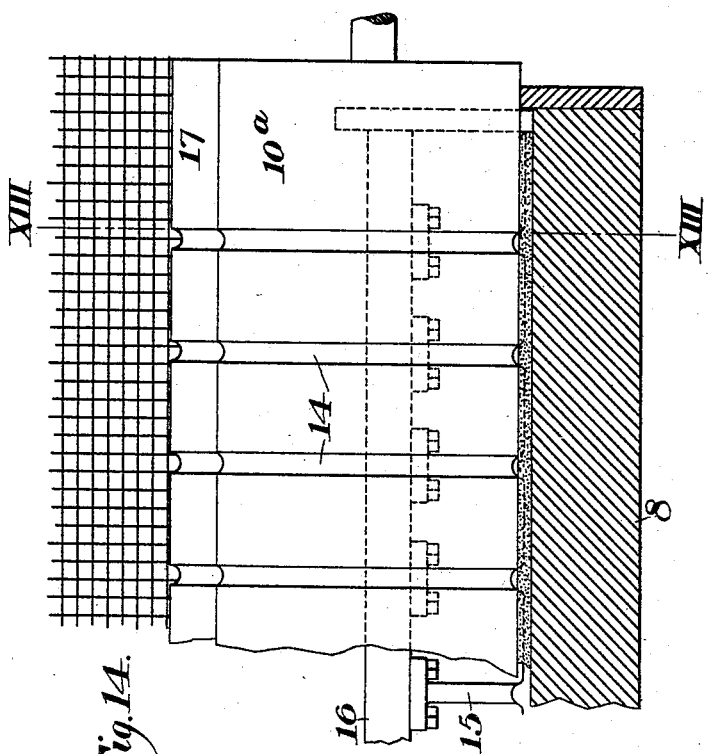
WITNESSES
INVENTOR No. 773,305. Patented October 25, 1904.

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, OF MORGANTOWN, WEST VIRGINIA, A CORPORATION OF WEST VIRGINIA.

WIRE-GLASS SHEET OR TILE AND METHOD OF MAKING SAME.

SPECIFICATION forming part of Letters Patent No. 773,305, dated October 25, 1904.

Application filed October 3, 1903. Serial No. 175,562. (No model.)

*To all whom it may concern:*

Be it known that I, FRANK L. O. WADSWORTH, of Allegheny, Allegheny county, Pennsylvania, have invented a new and useful Improvement in Wire-Glass Sheets or Tiles and Methods of Making the Same, of which the following is a full, clear, and exact description, reference being had to the accompanying drawings, forming part of this specification, in which—

Figure 1 shows in plan view a glass tile or plate constructed in accordance with my invention. Fig. 2 is an end elevation of Fig. 1. Figs. 3 and 4 are sectional views illustrating the preferred construction of the tile or plate. Figs. 5 and 6 are similar views showing other modifications, and Fig. 7 is a vertical sectional view indicating the manner in which the tiles or plates are fixed to a wall. The figures on the other sheets of the drawings illustrate the manner in which the tiles or plates can be made. Fig. 8 is a longitudinal section of a machine adapted for the manufacture of the articles shown in Figs. 1, 2, and 5. Fig. 9 is a partial vertical section on the line IX IX of Fig. 8. Fig. 10 shows in longitudinal section the table of the machine adapted for the manufacture of the article shown in Fig. 3. Fig. 11 shows in longitudinal section a table adapted for the manufacture of the article shown in Fig. 6, the table being shown in connection with a mesh having non-vitreous portions attached thereto, as will be explained below. Fig. 12 is a longitudinal section of a table and roll with the auxiliary apparatus adapted for making the same kind of article as can be made with the machine of Fig. 8. In the product of the machines shown in Figs. 8 and 12 the projecting portions of the wire mesh extend in transverse lines across the forming-table. In Fig. 13 I show in longitudinal section on the line XIII XIII of Fig. 14 a machine adapted for making such articles with the series of projecting portions extending lengthwise of the table. Fig. 14 is a vertical section through the table of Fig. 13.

Attempts have been made heretofore to manufacture tiles from glass as a substitute for the clay tiles commonly used; but so far as I know these attempts have not been satisfactory because of the difficulty experienced in securing the glass tiles properly to the walls to which they are to be applied. Where it has been attempted to secure them with the aid of projections fixed to the glass, the bond has not been sufficiently strong, and where it was attempted to use integral projecting portions of the glass as a means of securing the tile the bond is so rigid and inflexible that the tiles are apt to be broken when subjected to the strains caused by their own expansion or contraction under varying temperature or by the natural shrinkage of the cement employed to hold the tile to the wall.

The object of my invention is to overcome these difficulties and to provide a glass tile or plate that may be intimately and strongly attached to other portions of building structures and will form therewith an article which is fire-resistant and mechanically strong and which is less expensive than articles now employed for like purposes.

My invention enables me to use tiles or plates of large size without increasing the difficulty of securing them or rendering them too liable to break.

My invention consists in a glass tile or plate in which there is a series of wires or a wire mesh, portions of which are completely embedded within the glass and intermediate portions of which stand completely above the surface of the glass and so as to afford means of attachment to the cement. The buried portions of the wire or the wire mesh serve the same purpose as the mesh of ordinary wire-glass in strengthening the article against breaking and rendering it fire-resistant, and the exposed portions of the wire constitute locks by which the sheet may be attached to the building and caused to form therewith an integral mechanical structure.

Fig. 7 of the drawings shows the manner in which the tiles are attached to a wall. 2 2 are the glass tiles, and 3 is a wire mesh which is embedded in the body of the tile in like manner as is the mesh of ordinary wire-glass, and 4 4 are the projecting portions which extend in loops completely beyond the surface of the glass and constitute locks by which the tiles are secured to the body of plaster or cement 5 on which the tiles are set. These loops are preferably continuous with the other portion of the fabric, but may be cut after they are formed. They hold the tiles so firmly that they cannot be detached from the wall without breaking away the cement or breaking the wires, and they are held in such manner that the expansion or contraction of the tile and shrinkage of the cement will be least liable to damage the tile, because the exposed portions of the wire will stretch or yield slightly whenever stress in the cement or tile occurs.

In Figs. 1 and 2 I show a tile constructed substantially as in Fig. 7, with embedded portions of the mesh and intermediate projecting portions, the rear surface of the tile being substantially plain.

In Fig. 5 I show a tile constructed substantially as in Fig. 7, except that the embedded portion of the mesh is curved and is not straight, as in Fig. 7.

In Fig. 3 the rear face of the tile is formed with a series of grooves or recesses 6. The wire mesh is embedded in the tile; but intermediate portions thereof extend through the recesses 6, in which they are exposed, so that when the tile is applied to a wall the cement or plaster will fill the recesses on both sides of the mesh, and the latter will therefore lock the tile securely to the cement, as above explained.

In Fig. 6 the projecting portions 4 of the wire mesh are embedded in bars 7 of non-vitreous material, preferably cement or plaster-of-paris, which are applied thereto before the tiles are set on the wall and are preferably applied in the manufacture of the tile, as explained below. These bars may be on the rear face of the tile, in which case they constitute attaching devices for holding the tile to the wall, or they may be on the front face of the tile, in which case they afford means for attaching ornamental gratings or the like to the glass, and the glass in such case may be used in a window in the ordinary manner in which wire-glass is employed. The bars 7 strengthen the glass sheet and for this purpose can be made of any suitable dimensions.

Tiles or glass plates embodying my invention may be used as pavement-lights of large size and can readily be rendered non-slipping. This is illustrated in Fig. 4. Here the exposed portions of the wire mesh within the recesses 6 are covered with a body 7', of non-vitreous material, preferably cement or asphaltum, which form non-slipping treads or ribs, enabling pedestrians to pass over the glass without danger even when the sheets are of large size. Such pavement-lights made in large sizes are much cheaper than the composite glass and iron-frame structures usually employed, in which all the pieces of glass are small and require separate setting for each. My invention for the same reason avoids the difficulties of rendering such structures water-tight.

Other uses for articles made in accordance with my invention will suggest themselves to those skilled in the art, and the form of the glass plates and the shape of the projecting wires or mesh may be modified to suit the particular use to which the article is applied.

I will now describe, with reference to Sheets 2 and 3, apparatus suitable for the manufacture of the plates or tiles.

In Fig. 8, 8 is the table of a glass-rolling machine having on its surface parallel grooves 9 9, and 10 is a glass-forming roller. The wire mesh M, which is to be embedded in the glass, is placed upon the table, and bars 11 are laid upon it over the grooves 9 and are pressed downwardly, so as to force portions of the mesh into the grooves, the consequence being that intermediate portions of the mesh are caused to project somewhat above the surface of the table, as shown in Fig. 8. A mass of molten glass 12 is then placed upon the table and by the roller 10 is spread into the form of a sheet, which as it is formed surrounds and embeds within itself the upwardly-projecting portions of the mesh; but as the portions of the mesh within the grooves are shielded from the glass by the bars 11 they will remain exposed and will project from the surface of the glass when the sheet is removed from the table. The bars 11 may be withdrawn before putting the sheet into the annealing-leer or at any later stage of the manufacture. In Fig. 10 the table is provided with ridges 13, upon which the wire mesh is laid and upon which it is held by superposed bars 11. When the glass is cast upon the mesh and rolled, it embeds the wire mesh in the places between the ridges; but at those ridges grooves are formed in the glass, and the mesh is exposed therein, because the glass is prevented by the bars 11 from coming into contact with the mesh. The articles shown in Figs. 3 and 4 may be made in this way.

When it is desired to make the articles of Figs. 6 and 7 and to embed the exposed portions of the mesh in the non-vitreous material at the same operation in which the sheet is formed, I may employ the device shown in Fig. 11, in which the bars 7 of non-vitreous material are applied to the mesh before the glass is rolled thereon and preferably before the mesh is set on the rolling-table, since otherwise it would be necessary to dry the bars on the table before rolling the glass. The mesh is placed on the table with the bars 7 of non-vitreous material fitting in the grooves 9 and the intermediate portions of the mesh projecting above the table, and the glass is then cast thereon and rolled.

In Fig. 12 I show means by which the operation illustrated in Fig. 8 may be carried on by means of a roll. In this case the surface of the table 8 may be plain; but the roll 10' has a longitudinally-grooved surface the grooves of which are adapted to receive the bars 11'. The mesh is fed from a roll M' around the surface of the forming-roll 10' in the manner usual in the manufacture of wire-glass, and as the mesh passes over the grooves of the roll the bars 11' are set above the same and are pressed thereinto by a ribbed setting-roller 12'. The bars then fill the grooves and confine portions of the wire mesh within them, leaving the intermediate portions of the mesh projecting outwardly beyond the surface of the roll, so that as the roll passes over the glass and reduces it to sheet form it will embed these intermediate portions of the mesh within the glass, leaving exposed the portions of the mesh which are sheltered within the grooves by the bars 11'.

In the modified apparatus shown in Figs. 13 and 14 the groove 14 extends around the periphery of the forming-roll 10ª. With this apparatus I am able to dispense with the use of bars such as the bars 11' by employing presser-feet 15, which are fixed to the carriage 16 of the roll and extend into the grooves, so as to form guides by which the mesh is pressed within the grooves and is protected at the place where the intermediate portions of the mesh are forced into contact with the glass by the roll. Before reaching the presser-feet the mesh is corrugated in line therewith by a grooved roller 17 and a tongued roller 18. In this way the intermediate portions of the mesh between the grooves are caused to project beyond the roller and to be embedded in the glass, while the portions of the mesh in the grooves, being protected by the presser-feet, are held free from the glass and when the sheet is finished will project above the surface thereof.

In the use of all the forms of apparatus above described there is involved a common method of manufacture in which the wire mesh is protected at alternate portions from contact with the glass. The glass is then formed into a sheet around the unprotected portions of the mesh.

Other modifications in the apparatus for forming the articles may be made.

I claim—

1. The method herein described of making glass sheets which consists in protecting portions on both sides of a wire mesh from contact with the glass, and then forming the glass in sheet form around the intermediate and unprotected portions of the mesh; substantially as described.

2. A glass tile or plate having wires which for a portion of their length are entirely embedded within the body of the glass, and which at intermediate portions project from the face of the glass; substantially as described.

3. A glass tile or plate having a wire mesh which for a portion of its length is entirely embedded within the body of the glass, and which at intermediate portions projects from the face of the glass; substantially as described.

4. A glass tile or plate having grooves on its face and having wires extending through the glass between the grooves and exposed above the bottom of the grooves; substantially as described.

5. A glass tile or plate having grooves on its face and having wires extending through the glass between the grooves and exposed above the bottom of the grooves and a non-vitreous filling for the grooves; substantially as described.

6. A glass tile or plate having wires which for portions of their length are entirely embedded within the body of the glass, and which at intermediate portions project in loops from the face of the glass; substantially as described.

In testimony whereof I have hereunto set my hand.

FRANK L. O. WADSWORTH.

Witnesses:
 GEO. B. BLEMING,
 H. M. CORWIN.